UNITED STATES PATENT OFFICE.

SIMON F. MACKIE, OF NEW YORK, N. Y.

IMPROVED PROCESS FOR TREATING ORES.

Specification forming part of Letters Patent No. 49,637, dated August 29, 1865.

*To all whom it may concern:*

Be it known that I, SIMON F. MACKIE, residing in the city and county of New York, and State of New York, have invented certain new and useful Improvements in the Treatment of Gold Ores in the Process of Obtaining Gold therefrom; and I do hereby declare that the following is a full and correct description thereof.

My improved process, while capable of being applied to every gold-containing ore, possesses peculiar advantages when ores containing a notable quantity of iron are treated.

In carrying out my improved process I first remove from among the substances present in the ore parts of the volatile substances, the silica, and a portion or the whole of the iron or other substances capable of forming fusible combinations with silica. For this purpose I roast the ore in a reverberatory furnace or other contrivance capable of oxidizing the iron, &c., and of simultaneously removing portions of the volatile substances present. The roasted ore I fuse in any suitable furnace—say, for example, the Swedish suluöfen—obtaining thereby a matte or speiss and slag. I separate the slag from the matte, finding the gold in the matte. If the ore does not possess such a composition as leads to the production in a fusion of a good, easily separated matte and slag, I give it a suitable composition, either by mixing ores of various composition or by the addition of either limestone, fluor-spar, silica, pyrites, or other substances which experience has taught metallurgists to use as fluxes in order to supply the defects in ores; and when I am not able to remove in one fusion all the iron and other constituents desirable to be removed at this stage of the process without an excessive loss of gold in the slag, I roast again, mix the roasted matte with silica or silica-containing substances, and then fuse again, thereby obtaining, besides slag, a second matte richer in gold than the first; and I repeat these operations until a matte rich enough to operate upon by the subsequent portion of my process is obtained.

Having obtained a matte product or substance rich enough for my purpose, I render soluble those portions capable of being brought into solution. For this purpose I again roast the mass in a suitable furnace, producing in this roasting oxides and salts of the various metallic substances other than gold, and then proceed to convert such portions of the roast not rendered soluble by this roasting into soluble substances by the action of acids. The acid may be used by itself, either in an aqueous solution or in vapor, or it may be combined with other substances capable of giving up some portion of it.

In the use of liquids I place the mass or roast in a tub or suitable vessel and pour upon it sufficient quantity of dilute sulphuric or muriatic acid, and when the reaction has ceased separate the insoluble residue, which contains gold. A solution of persulphate or perchloride of iron, or other substance capable of giving up a portion of its acid, may be used instead of the acid solution.

When using acid vapors I place the roast in a suitable chamber—say a gas-retort—and, having heated it to a temperature not high enough to decompose the salts formed, submit it to the action of a current of moist air and sulphurous or muriatic acid vapors. When the reaction has ceased I treat the mass which has been subjected to the action of acids in either of the above-described forms with a sufficient quantity of water to dissolve up the soluble portions, and then separate the solution from the insoluble residue, using such apparatus as is commonly used for leaching out and purifying soda in the manufacture of soda or ash. Any apparatus which will contain the mass and liquid and permit the solid matter to separate and the liquid to be drawn off will answer. This insoluble residue contains gold. This gold may be freed from the contaminating impurities by fusing the mass with borax, litharge, and lead, separating the slag from the lead and cupelling off the lead, thereby obtaining a mass of gold, or by any other process capable of giving a similar result.

It will be evident to those skilled in the art of working gold ores that my object in the use of acids is to dissolve out from the matte the baser metals and other substances besides gold, and to leave the gold with the residue; and therefore acids, acid vapors, or substances yielding acids which will not leave the gold in the residue are not to be used.

I do not claim, broadly, the use of acids for separating metals from each other; neither do I claim, broadly, roasting and fusing ores of gold.

I claim as my invention and improvement in the mode of treating ores of gold—

1. The within-described mode of obtaining a rich gold residue from ores of gold by treating the ores by roasting and fusing and subjecting the roast to the action of acids, substantially as described.

2. Removing the baser metals and other matters from the roasted matte and leaving a rich gold residue by subjecting the roasted matte to the action of acids, substantially as described.

SIMON F. MACKIE.

Witnesses:
F. C. TREADWELL, Jr.,
I. A. DUNCAN.